(12) United States Patent
Du et al.

(10) Patent No.: US 12,130,390 B2
(45) Date of Patent: Oct. 29, 2024

(54) AGGREGATION-BASED LIDAR DATA ALIGNMENT

(71) Applicant: GM GLOBAL TECHNOLOGY OPERATIONS LLC, Detroit, MI (US)

(72) Inventors: Xinyu Du, Oakland Township, MI (US); Yao Hu, Sterling Heights, MI (US); Wende Zhang, Birmingham, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 359 days.

(21) Appl. No.: 17/569,948

(22) Filed: Jan. 6, 2022

(65) Prior Publication Data

US 2023/0213633 A1 Jul. 6, 2023

(51) Int. Cl.
*G01S 7/497* (2006.01)
*B60W 60/00* (2020.01)
*G01S 17/86* (2020.01)
*G01S 17/89* (2020.01)
*G01S 17/931* (2020.01)

(52) U.S. Cl.
CPC ............ *G01S 7/4972* (2013.01); *B60W 60/00* (2020.02); *G01S 17/86* (2020.01); *G01S 17/89* (2013.01); *G01S 17/931* (2020.01); *B60W 2420/408* (2024.01)

(58) Field of Classification Search
CPC ...... G01S 7/4972; G01S 17/931; G01S 17/86; G01S 17/89; B60W 60/00; B60W 2420/408
See application file for complete search history.

(56) References Cited

U.S. PATENT DOCUMENTS

| | | | |
|---|---|---|---|
| 9,043,069 B1 * | 5/2015 | Ferguson | G06T 7/215 |
| | | | 701/23 |
| 10,424,127 B2 | 9/2019 | Jiang et al. | |
| 10,481,600 B2 | 11/2019 | Yen et al. | |
| 10,501,092 B2 | 12/2019 | Huang et al. | |

(Continued)

OTHER PUBLICATIONS

"Iterative closest point", May 22, 2021, Wikipedia (Year: 2021).*

(Continued)

*Primary Examiner* — Yazan A Soofi
*Assistant Examiner* — Naeem Taslim Alam

(57) ABSTRACT

A LIDAR-to-vehicle alignment system includes a memory and alignment and autonomous driving modules. The memory stores points of data provided based on an output of one or more LIDAR sensors and localization data. The alignment module performs an alignment process including: based on the localization data; determining whether a host vehicle is turning; in response to the host vehicle turning; selecting a portion of the points of data; aggregating the selected portion to provide aggregated data; selecting targets based on the aggregated data; and based on the selected targets, iteratively reducing a loss value of a loss function to provide a resultant LIDAR-to-vehicle transformation matrix. The autonomous driving module: based on the resultant LIDAR-to-vehicle transformation matrix, converts at least the selected portion to at least one of vehicle coordinates or world coordinates to provide resultant data; and performs one or more autonomous driving operations based on the resultant data.

20 Claims, 9 Drawing Sheets

(56) References Cited

U.S. PATENT DOCUMENTS

| | | | |
|---|---|---|---|
| 10,503,170 B2 | 12/2019 | Du et al. | |
| 10,521,974 B2 | 12/2019 | Du et al. | |
| 10,542,211 B2 | 1/2020 | Lin et al. | |
| 10,558,217 B2 | 2/2020 | Jiang et al. | |
| 10,580,232 B2 | 3/2020 | Jiang et al. | |
| 10,600,257 B2 | 3/2020 | Jiang et al. | |
| 10,600,261 B2 | 3/2020 | Huang et al. | |
| 10,663,309 B2 | 5/2020 | Lin et al. | |
| 10,678,247 B2 | 6/2020 | Jiang et al. | |
| 10,698,420 B2 | 6/2020 | Sankavaram et al. | |
| 10,946,865 B1 | 3/2021 | Lin et al. | |
| 10,974,730 B2 | 4/2021 | Hu et al. | |
| 10,977,503 B2 | 4/2021 | Hu | |
| 10,981,577 B1 | 4/2021 | Hu | |
| 2017/0299707 A1* | 10/2017 | Nguyen | B60T 7/12 |
| 2018/0024246 A1* | 1/2018 | Jeong | G01S 17/58 |
| | | | 359/204.1 |
| 2018/0088228 A1* | 3/2018 | Li | G01S 13/865 |
| 2018/0151958 A1* | 5/2018 | Lim | H01Q 21/065 |
| 2018/0231654 A1* | 8/2018 | Bilik | G01S 17/931 |
| 2019/0011544 A1* | 1/2019 | Gassend | G01S 17/931 |
| 2019/0011550 A1* | 1/2019 | Hui | G01S 13/931 |
| 2019/0066398 A1 | 2/2019 | Sankavaram et al. | |
| 2019/0066406 A1 | 2/2019 | Sarwar et al. | |
| 2019/0108692 A1 | 4/2019 | Du et al. | |
| 2019/0146491 A1 | 5/2019 | Hu et al. | |
| 2019/0266779 A1* | 8/2019 | Kulkarni | G06T 15/04 |
| 2019/0353751 A1* | 11/2019 | Raphaeli | G01S 7/292 |
| 2020/0003869 A1* | 1/2020 | Yang | G01S 17/86 |
| 2020/0005489 A1* | 1/2020 | Kroeger | G06T 7/85 |
| 2020/0023891 A1 | 1/2020 | Lin et al. | |
| 2020/0064483 A1* | 2/2020 | Li | G01S 13/867 |
| 2020/0103236 A1* | 4/2020 | Adams | G01C 21/3811 |
| 2020/0240794 A1* | 7/2020 | Prasser | G05D 1/0212 |
| 2020/0339140 A1 | 10/2020 | Lin et al. | |
| 2021/0035279 A1 | 2/2021 | Hu et al. | |
| 2021/0063578 A1* | 3/2021 | Wekel | G01S 17/894 |
| 2021/0124344 A1 | 4/2021 | Hu et al. | |
| 2021/0134085 A1 | 5/2021 | Hu et al. | |
| 2021/0325902 A1* | 10/2021 | Wood | G05D 1/021 |
| 2021/0356562 A1* | 11/2021 | Liu | G01S 7/4808 |
| 2021/0373138 A1 | 12/2021 | Jiang et al. | |
| 2021/0405185 A1* | 12/2021 | Price | G01S 13/931 |
| 2022/0163635 A1* | 5/2022 | Dunn | G01S 17/931 |
| 2022/0197301 A1* | 6/2022 | Moawad | G01S 7/2955 |
| 2022/0351463 A1* | 11/2022 | Huang | G06V 20/647 |
| 2022/0371602 A1* | 11/2022 | Pan | G01S 17/86 |
| 2023/0204776 A1* | 6/2023 | Yang | G01S 17/931 |
| | | | 356/4.01 |
| 2023/0351686 A1* | 11/2023 | Kong | G06V 10/803 |

OTHER PUBLICATIONS

U.S. Appl. No. 17/171,005, filed Feb. 9, 2021, Lin et al.
U.S. Appl. No. 17/339,626, filed Jun. 4, 2021, Du et al.
U.S. Appl. No. 17/350,780, filed Jun. 17, 2021, Hu et al.
U.S. Appl. No. 17/408,758, filed Aug. 23, 2021, Hu.

* cited by examiner

AGGREGATION-BASED LIDAR DATA ALIGNMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle object detection systems, and more particularly to vehicle light detection and ranging (LIDAR) systems.

Vehicles can include various sensors for detecting a surrounding environment and objects in that environment. The sensors may include cameras, radio detection and ranging (RADAR) sensors, LIDAR sensors, etc. A vehicle controller can, in response to the detected surroundings, perform various operations. The operations can include performing partial and/or fully autonomous vehicle operations, collision avoidance operations, and informational reporting operations. The accuracy of the performed operations can be based on the accuracy of the data collected from the sensors.

SUMMARY

A LIDAR-to-vehicle alignment system is disclosed and includes a memory, an alignment module, and an autonomous driving module. The memory is configured to store points of data provided based on an output of one or more LIDAR sensors and localization data. The alignment module is configured to perform an alignment process including: based on the localization data; determining whether a host vehicle is turning; in response to the host vehicle turning; selecting a portion of the points of data; aggregating the selected portion of the points of data to provide aggregated data; selecting targets based on the aggregated data; and based on the selected targets, iteratively reducing a loss value of a loss function to provide a resultant LIDAR-to-vehicle transformation matrix. The autonomous driving module is configured to: based on the resultant LIDAR-to-vehicle transformation matrix, convert at least the selected portion of the points of data to at least one of vehicle coordinates or world coordinates to provide resultant data; and perform one or more autonomous driving operations based on the resultant data.

In other features, the alignment module is configured to receive the localization data from one or more of a global position sensor or an inertial measurement sensor.

In other features, the alignment module is configured to refrain from performing data selection and aggregation and target selection when the host vehicle is not cornering.

In other features, the alignment module is configured to select data points and the targets based on turning points.

In other features, the alignment module is configured to select an area based on a turning point, remove ground points based on the selected area, identify the targets, and perform a data clustering algorithm to select one of the targets to monitor.

In other features, the alignment module is configured to accumulate multiple scenes of LIDAR data and, based on the multiple scenes of LIDAR data, minimize the loss value.

In other features, the alignment module is configured to perform a continuity check to determine which of the points of data to select and which of the points of data to discard.

In other features, the alignment module is configured to: aggregate LIDAR scans of data for a predefined space; based on the aggregated LIDAR scans of data, perform target selection; and subsequent to performing target selection, down sample each frame of data associated with the aggregated LIDAR scans of data using an intensity filter and a random filter to provide resultant target data.

In other features, the alignment module is configured to: get z value for each of multiple LIDAR scans; obtain a normal distribution of the aggregated data associated with the LIDAR scans to extract a first mean value of the aggregated data associated with the LIDAR scans; select data around the first mean value; obtain another normal distribution of the selected data around the first mean value to obtain a second mean value that is not based on ground points; extract ground points around the second mean value; label data other than the ground points as target data; and when a predetermined amount of target data is collected, perform a clustering algorithm to select a portion of the target data.

In other features, the alignment module is configured to, when iteratively reducing the loss value: load optimization parameters and an initial estimated LIDAR-to-vehicle transformation matrix; and iteratively (i) change the initial estimated LIDAR-to-vehicle transformation matrix or a last determined LIDAR-to-vehicle transformation matrix to provide the resultant LIDAR-to-vehicle transformation matrix, (ii) evaluate the change in the resultant LIDAR-to-vehicle transformation matrix including determining the loss value, and (iii) based on the loss value, determining whether to perform another iteration.

In other features, the alignment module is configured to when evaluating the loss function: calculate a LIDAR-to-world transformation matrix using the resultant LIDAR-to-vehicle transformation matrix; project the aggregated data to world coordinate data based on the LIDAR-to-world transformation matrix; apply a binary tree to the world coordinate data; provide distances by, for each LIDAR data point, calculating a distance to a neighboring data point; and determine the loss value based on an average of the distances.

In other features, the loss function is a density-based loss function that characterizes at least one of LIDAR misalignment severity or point density relative to one of the selected targets.

In other features, the autonomous vehicle driving method includes: storing points of data provided based on an output of one or more LIDAR sensors and localization data; performing a LIDAR-to-vehicle alignment process including (i) based on the localization data, determining whether a host vehicle is turning, (ii) in response to the host vehicle turning, selecting a portion of the points of data and aggregating the selected portion of the points of data to provide aggregated data, (iii) selecting targets based on the aggregated data, and (iv) based on the selected targets, iteratively reducing a loss value of a loss function to provide a resultant LIDAR-to-vehicle transformation matrix; based on the resultant LIDAR-to-vehicle transformation matrix, converting at least the selected portion of the points of data to at least one of vehicle coordinates or world coordinates to provide resultant data; and performing one or more autonomous driving operations based on the resultant data.

In other features, the autonomous vehicle driving method further includes: selecting an area based on a turning point;

removing ground points based on the selected area; identifying a targets; and performing a data clustering algorithm to select one of the targets to monitor.

In other features, the autonomous vehicle driving method further includes: performing a continuity check to determine which of the points of data to select and which of the points of data to discard; and accumulating multiple scenes of LIDAR data and, based on the multiple scenes of LIDAR data, minimizing the loss value.

In other features, the autonomous vehicle driving method further includes: aggregating LIDAR scans of data for a predefined space; based on the aggregated LIDAR scans of data, performing target selection; and subsequent to performing target selection, down sampling each frame of data associated with the aggregated LIDAR scans of data using an intensity filter and a random filter to provide resultant target data.

In other features, the autonomous vehicle driving method further includes: getting z value for each of multiple LIDAR scans; determining at least one mean value based on the aggregated data associated with the LIDAR scans; extracting ground points based on the at least one mean value; labeling data other than the ground points as target data; and when a predetermined amount of target data is collected, performing a clustering algorithm to select a portion of the target data. In other features, the autonomous vehicle driving method further includes: getting z value for each of multiple LIDAR scans; obtaining a normal distribution of the aggregated data associated with the LIDAR scans to extract a first mean value of the aggregated data associated with the LIDAR scans; selecting data around the first mean value; obtaining another normal distribution of the selected data around the first mean value to obtain a second mean value that is not based on ground points; extracting ground points around the second mean value; labeling data other than the ground points as target data; and when a predetermined amount of target data is collected, performing a clustering algorithm to select a portion of the target data.

In other features, the autonomous vehicle driving method further includes, when iteratively reducing the loss value: loading optimization parameters and an initial estimated LIDAR-to-vehicle transformation matrix; and iteratively (i) changing the initial estimated LIDAR-to-vehicle transformation matrix or a last determined LIDAR-to-vehicle transformation matrix to provide the resultant LIDAR-to-vehicle transformation matrix, (ii) evaluating the change in the resultant LIDAR-to-vehicle transformation matrix including determining the loss value, and (iii) based on the loss value, determining whether to perform another iteration.

In other features, the autonomous vehicle driving method further includes, when evaluating the loss function: calculating a LIDAR-to-world transformation matrix using the resultant LIDAR-to-vehicle transformation matrix; projecting the aggregated data to world coordinate data based on the LIDAR-to-world transformation matrix; based on the world coordinate data, providing distances by, for each LIDAR data point, calculating a distance to a neighboring data point; and determining the loss value based on an average of the distances. In other features, the autonomous vehicle driving method further includes, when evaluating the loss function: calculating a LIDAR-to-world transformation matrix using the resultant LIDAR-to-vehicle transformation matrix; projecting the aggregated data to world coordinate data based on the LIDAR-to-world transformation matrix; applying a binary tree to the world coordinate data; providing distances by, for each LIDAR data point, calculating a distance to a neighboring data point; and determining the loss value based on an average of the distances.

In other features, the loss function is a density-based loss function that characterizes at least one of LIDAR misalignment severity or point density relative to one of the selected targets.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

The present disclosure will become more fully understood from the detailed description and the accompanying drawings, wherein.

In the drawings, reference numbers may be reused to identify similar and/or identical elements.

DETAILED DESCRIPTION

Figure 1:
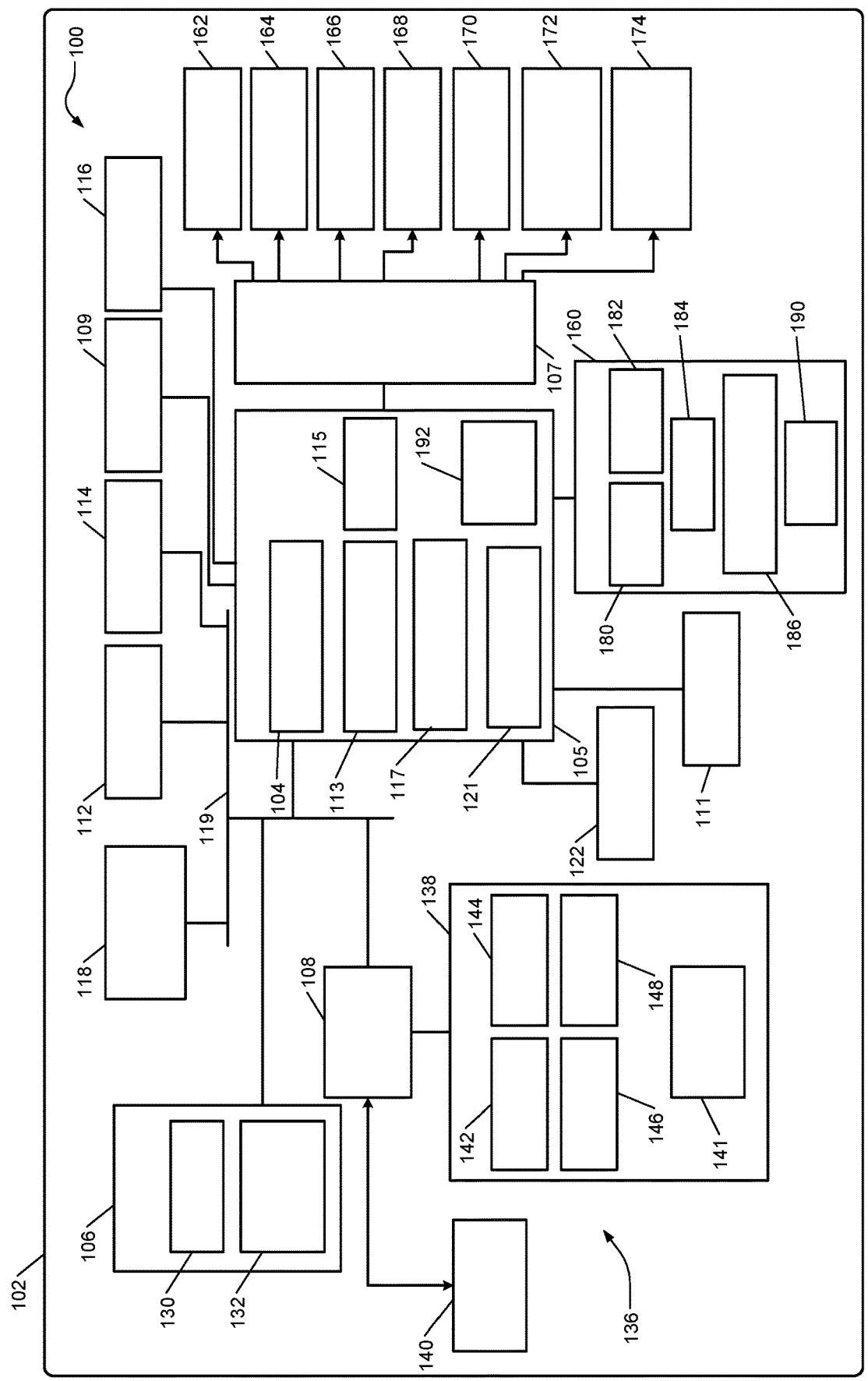
FIG. 1 is a functional block diagram of an example vehicle system including an alignment validation module in accordance with the present disclosure.

An autonomous driving module may perform sensor alignment and fusion operations, perception and localization operations, and path planning and vehicle control operations. The stated operations may be performed based on data collected from various sensors, such as LIDAR sensors, RADAR sensors, cameras, and an inertial measurement sensor (or inertial measurement unit), and data collected from a global positioning system (GPS). Sensor alignment and fusion may include alignment of a coordinate system of each sensor with a reference coordinate system, such as a vehicle coordinate system. Fusion may refer to the collecting and combining of the data from the various sensors.

Perception refers to the monitoring of vehicle surroundings and the detection and identification of various features and/or objects in the surroundings. This can include determining various aspects of the features and objects. The term "feature" as used herein refers to one or more detected points that can be reliably used to determine a location of an object. This is unlike other data points detected, which do not provide reliable information regarding location of an object, for example, a point on a leaf or branch of a tree. The aspects determined may include object distances, locations, sizes, shapes, orientations, trajectories, etc. This may include determining the type of object detected, for example, whether the object is a traffic sign, a vehicle, a pole, a pedestrian, a ground surface, etc. Lane marking information may also be detected. A feature may refer to a surface, edge, or corner of a building. Localization refers to information determined about a host vehicle, such as location, speed, heading, etc. Path planning and vehicle control (e.g., braking, steering, and accelerating) are performed based on the gathered perception and localization information.

A vehicle may include multiple LIDAR sensors. LIDAR sensor alignment including LIDAR-to-vehicle alignment and LIDAR-to-LIDAR alignment affects accuracy of determined perception and localization information including feature and object information, such as that described above. GPS measurements are used for vehicle localization, mapping and LIDAR alignment.

Data collected from different LIDAR sensors is transformed (or projected) to the same coordinate system prior to being evaluated. For example, the LIDAR data may be transformed to a vehicle coordinate system or a world coordinate system. The accuracy of this transformation is based on the state of alignment of the alignment system. The alignment refer to whether entries in a transformation matrix $T_{LtoV}$, which is used to transform LIDAR coordinate data to vehicle coordinate data, are valid. The transformation matrix $T_{LtoV}$ may be used to transform coordinates in the vehicle coordinate system to LIDAR coordinate data. The alignment can become degraded or incorrect over time, such that the entries of the transformation matrix $T_{LtoV}$ are no longer valid, for various reasons. The alignment can become degraded due to misalignment of a sensor, vibration of a sensor, an accident, etc. Realignment of the LIDAR sensors may be performed offline at an alignment service center by a trained service technician using special equipment. A customer of a vehicle typically cannot perform an offline alignment of the LIDAR sensors.

Aggregation of LIDAR frames includes using localization data, such as GPS data and data from an inertial measurement unit (IMU), LIDAR data and a LIDAR-to-vehicle coordinate alignment transformation matrix $T_{LtoV}$ (referred to hereinafter as "the transformation matrix $T_{LtoV}$". The transformation matrix $T_{LtoV}$ is used to provide resultant data in a vehicle coordinate system. If no alignment is performed, than a resultant image is blurred do to errors in the transformation matrix $T_{LtoV}$. Misalignment can cause errors when performing, for example, autonomous vehicle maneuvers, object detection, collision avoidance, etc.

The examples set forth herein include online misalignment detection and correction. An alignment algorithm is provided that includes determining a valid transformation matrix $T_{LtoV}$ for transforming data between LIDAR and vehicle coordinates. An alignment algorithm is disclosed that maximizes point density of an aggregated LIDAR point cloud of a selected target. Amount of alignment error tends to increase when the volume of a point cloud increases (or density of the point cloud decreases). By increasing point densities and/or decreasing volumes of points associated with selected targets, sharpness of images is improved and the amount of alignment error is decreased.

The alignment algorithm includes: a sub-algorithm to dynamically process LIDAR data to calculate alignment results; a sub-algorithm to automatically select one or more targets during a cornering maneuver; use of one or more loss functions; a sub-algorithm to optimize the one or more loss functions used; and a sub-algorithm to generate results using multiple scenes of data. The loss functions may be density-based loss functions used to characterize misalignment severity. The sub-algorithm to optimize the one or more loss functions speed up a corresponding iterative process being performed, as further explained below. Each scene of data refers to a set of images of LIDAR data collected for a certain area through which a vehicle has traveled. Data collected for multiple scenes is used to improve robustness of the resultant determined transformation. The alignment algorithm performs target selection and is applicable to any shape target used for alignment purposes.

The transformation matrix $T_{LtoV}$ may be represented by equation 1, where R is a 3×3 rotation matrix and T is a translation vector. The rotation matrix R is generated based on roll, pitch and yaw angles, as shown by equation 2. The translation vector T may be represented by equation 3 and is a 3×1 vector used for translation, where $T_x$, $T_y$, $T_z$ are translation values for x, y and z directions. R and T are dependent on $T_x$, $T_y$, $T_z$, and roll, pitch and yaw angles.

$$\text{Transformation Matrix } T_{LtoV} = \begin{bmatrix} R & T \\ 0 & 1 \end{bmatrix} \quad (1)$$

$$R = R_Z(\alpha)R_y(\beta)R_x(\gamma) = \quad (2)$$

$$\begin{bmatrix} \cos\alpha & -\sin\alpha & 0 \\ \sin\alpha & \cos\alpha & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\gamma & -\sin\gamma \\ 0 & \sin\gamma & \cos\gamma \end{bmatrix} =$$

$$\begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix}$$

$$T = \begin{bmatrix} T_x \\ T_y \\ T_z \end{bmatrix} \quad (3)$$

Data in vehicle coordinates is equal to a product of the transformation matrix $T_{LtoV}$ and the collected LIDAR sensor data. An inverse of the transformation matrix $T_{LtoV}$ can be used to transform from the vehicle coordinates to the LIDAR coordinates.

The examples set forth herein include LIDAR-to-vehicle alignment systems and algorithms, which "online" generate the transformation matrix $T_{LtoV}$. The transformation matrix $T_{LtoV}$ is used to provide a dynamic linear mapping between LIDAR and vehicle coordinates. This provides dynamic calibration for individual vehicles as well as for a large fleet of vehicles while minimizing and/or eliminating a need for manufacturing plant, dealership and/or service station alignments.

FIG. 1 shows an example vehicle system 100 of a vehicle 102 including an online alignment module 104. Operations performed by the online alignment module 104 are further described below with respect to FIGS. 1-10. The vehicle system 100 may include an autonomous driving module 105, a body control module (BCM) 107, a telematics module 106, a propulsion control module 108, a power steering system 109, a brake system 111, a navigation system 112, an infotainment system 114, an air-conditioning system 116, and other vehicle systems and modules 118. The autonomous driving module 105 includes the online alignment module 104, a fusion module 113, a perception module 115, a mapping and localization module 117, and a path planning module 121. The mapping and localization module 117 may include a GPS correction module. Operations of these modules are further described below.

The modules and systems 104-108, 112-115, 118, and 121 may communicate with each other via a controller area network (CAN) bus, an Ethernet network, a local interconnect network (LIN) bus, another bus or communication network and/or wirelessly. Item 119 may refer to and/or include a CAN bus, an Ethernet network, a LIN bus and/or other bus and/or communication network. This communication may include other systems, such as systems 109, 111, 116. A power source 122 may be included and power the autonomous driving module 105 and other systems, modules, devices and/or components. The power source 122 may include an accessory power module, one or more batteries, generators and/or other power sources.

The telematics module 106 may include transceivers 130 and a telematics control module 132. The propulsion control module 108 may control operation of a propulsion system 136 that may include an engine system 138 and/or one or more electric motor(s) 140. The engine system 138 may include an internal combustion engine 141, a starter motor 142 (or starter), a fuel system 144, an ignition system 146, and a throttle system 148.

The autonomous driving module 105 may control the modules and systems 106, 108, 109, 111, 112, 114, 116, 118 and other devices and systems based on data from sensors 160. The other devices and systems may include window and door actuators 162, interior lights, 164, exterior lights 166, trunk motor and lock 168, seat position motors 170, seat temperature control systems 172, and vehicle mirror motors 174. The sensors 160 may include temperature sensors, pressure sensors, flow rate sensors, position sensors, etc. The sensors 160 may include LIDAR sensors 180, RADAR sensors 182, cameras 184, inertial measurement sensor 186, GPS sensors 190, and/or other environment and feature detection sensors. The GPS sensors 190 may be implemented as part of the navigation system 112. The LIDAR sensors 180, the inertial measurement sensor 186, and the GPS sensors 190 may provide the LIDAR data points, inertial measurement data and GPS data referred to below.

The autonomous driving module 105 may include memory 192, which may store sensor data, historical data, alignment information, etc. The memory 192 may include dedicated buffers, referred to below.

Figure 2:
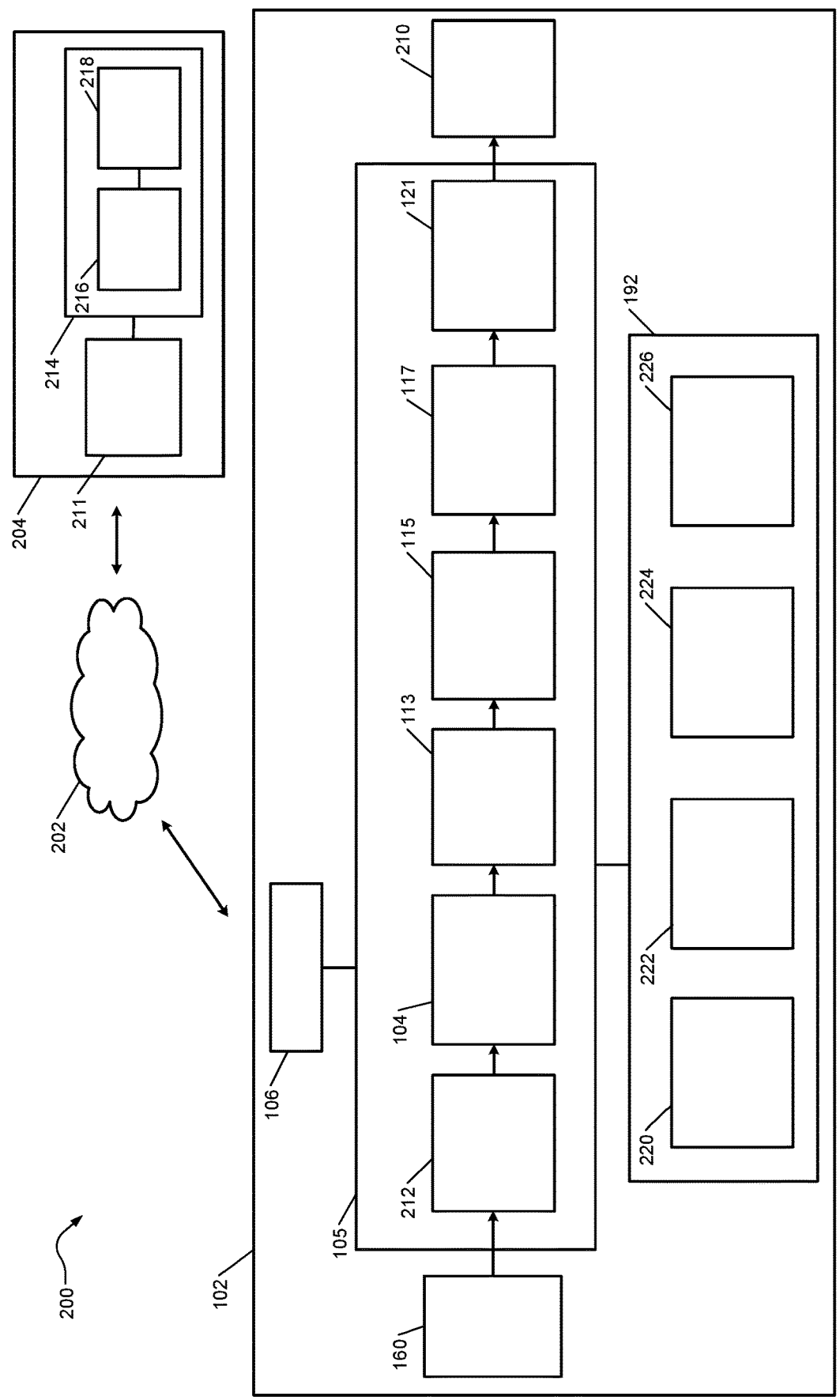
FIG. 2 is a functional block diagram of an example alignment system including a vehicle and a back office in accordance with the present disclosure.

FIG. 2 shows an example alignment system 200 including a first (or host) vehicle (e.g., the vehicle 102 of FIG. 1) and/or other vehicles, a distributed communications network 202 and a back office 204. The host vehicle includes the autonomous driving module 105, the vehicles sensors 160, the telematics module 106, and actuators 210. The actuators 210 may include motors, drivers, valves, switches, etc.

The back office 204 may be a central office that provides services for the vehicles including data collection and processing services. The back office 204 may include a transceiver 211 and a server 214 with a control module 216 and memory 218. In addition or as an alternative, the vehicles may be in communication with other cloud-based network devices other than the server.

The autonomous driving module 105 may include a sensor data collection module 212, the online alignment module 104, the fusion module 113, the perception module 115, the mapping and localization module 117 and the path planning module 121. The sensor data collection module 212 may collect data from the sensors 160 including LIDAR data from multiple LIDAR sensors. The online alignment module 104 may perform sensor alignment operations, as further described below, based on outputs of the sensors 160 (e.g., the sensors 180, 182, 184, 186, 190). The fusion module 113 aggregates the data received from the difference sensors after being transformed to, for example, vehicle or world coordinates. The aggregation may be time based.

The online alignment module 104 determines whether LIDAR sensors and/or other sensors are aligned, meaning differences in information provided by the LIDAR sensors and/or other sensors for the same one or more features and/or objects are within predetermined ranges of each other. The online alignment module 104 may determine difference values for six degrees of freedom of the LIDAR sensors including roll, pitch, yaw, x, y, and z difference values and based on this information determines whether the LIDAR sensors are aligned. The x coordinate may refer to a lateral horizontal direction. The y coordinate may refer to a fore and aft or longitudinal direction, and the z direction may refer to a vertical direction. The x, y, z coordinates may be switched and/or defined differently. If not aligned, one or more of the LIDAR sensors may be recalibrated and/or an alignment process as further described below may be performed.

The perception module 115 may perform perception operations based on the transformed and aggregated sensor data provided from the fusion module 113. The received data may be used to determine aspects of an environment surrounding a corresponding host vehicle (e.g., the vehicle 102 of FIG. 1). This may include (i) generating perception information as stated above, and/or (ii) detection and identification of features and objects, if not already performed, and determining locations, distances, and trajectories of the features and objects relative to the host vehicle 102. The mapping and localization module 117 map perform GPS mapping and localization operations including real-time GPS positioning, which refers to providing GPS information for a current location of the host vehicle.

The path planning module 121 may determine a path for the vehicle based on an output of the mapping and localization module 117. The path planning module 121 may perform autonomous vehicle operations including controlling operations of the vehicle 102 based on the determined path including controlling operations of the power steering system 109, the propulsion control module 108, the brake system 111 and/or other systems and devices of FIG. 1. This may include controlling operation of the actuators 210 and/or performing reporting information, generating alert messages, alerting nearby vehicles, etc. The autonomous vehicle operations may include collision avoidance operations and/or informational reporting operations.

The autonomous driving module 105 may operate in an offline mode or an online mode. The offline mode refers to when the back office 204 collects data and performs data processing for the autonomous driving module 105. This may include, for example, collecting GPS data from the vehicle 102 and performing GPS positioning correction and LIDAR alignment for data annotation and providing corrected GPS data and data annotation back to the autonomous driving module 105. A neural network of the autonomous driving module 105 may be trained based on the data annotation. GPS position corrections may be made prior to data annotation. Although not shown in FIG. 2, the control module 216 of the server 214 may include one or more of the modules 212, 104, 113, and/or perform similar operations as one or more of the modules 212, 104 and/or 113.

During the offline mode, the server 214 is processing data previously collected over an extended period of time. During the online mode, the autonomous driving module 105 performs GPS positioning correction and/or the LIDAR alignment. This may be implemented with or without aid of a cloud-based network device, such as the server 214. During the online mode, the autonomous driving module 105 is performing real-time GPS positioning and LIDAR alignment using collected and/or historical data. This may include data collected from other vehicles and/or infrastructure devices. The cloud-based network device may provide historical data, historical results, and/or perform other operations to aid in the real-time GPS positioning and LIDAR alignment. The real-time GPS positioning refers to providing GPS information for a current location of the host vehicle. LIDAR alignment information is generated for a current state of one or more LIDAR sensors.

The modules 105, 212, 104, 113, 115, 117, 121 may access the memory 192. The memory 192 may include, for example, a raw data buffer 220, a target data buffer 222, a result transformation matrix buffer 224, and other buffers 226. The raw data buffer 220 may store raw data collected from sensors, such as the LIDAR sensors 180 of FIG. 1. The target data buffer 222 may store data associated with one or more selected targets. The result transformation matrix buffer 224 may store a determined transformation matrix determined using the methods and algorithms of FIGS. 3-8.

Figure 3:
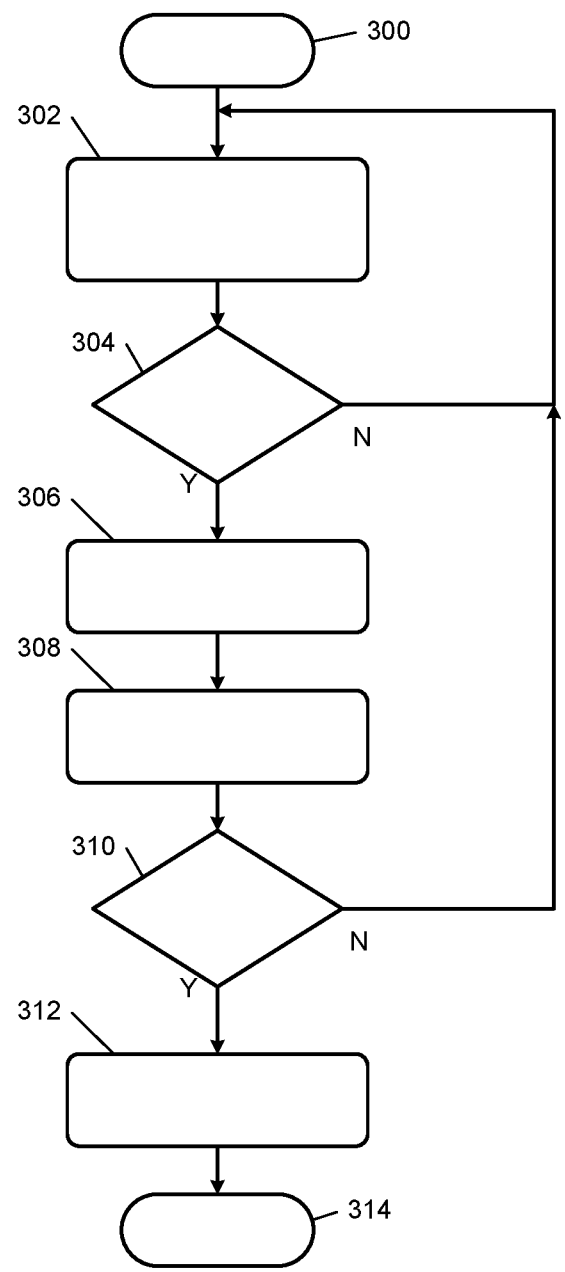
FIG. 3 illustrates an example alignment method in accordance with the present disclosure.

FIG. 3 shows an example alignment method, which may be implemented by the online alignment module 104 of FIGS. 1-2. The alignment method may include the methods and algorithms of FIGS. 4-8, which may be implemented by the systems of FIGS. 1-2. The alignment method is performed to determine a best alignment transformation matrix $T_{LtoV}$, which is a 4×4 matrix. The transformation matrix is a linear mapping that can be used for dynamic transformations from vehicle-to-LIDAR coordinates or from LIDAR-to-vehicle coordinates. The alignment method may be iteratively performed and may begin at 300. At 302, LIDAR data and localization data may be loaded in the raw data buffer 220. A timestamp i of LIDAR data may be represented by equation 4. The localization data may be represented by equation 5 and may be provided by the GPS sensors 190 and/or the inertial measurement sensor 186. The sensors 190 and 186 provide vehicle orientation and translation information. Equation 5 provides a vehicle (V) to world (W) transformation matrix $T_{VtoW,i}$.

$$L_i = [x_i, y_i, z_i]^T \quad (4)$$

$$T_{VtoW,i} = \begin{bmatrix} R_i & T_i \\ 0 & 1 \end{bmatrix}, \text{ where } T = \begin{bmatrix} T_{x,i} \\ T_{y,i} \\ T_{z,i} \end{bmatrix} \quad (5)$$

At 304, the online alignment module 104 may determine if the vehicle 102 is cornering. Cornering (or turning) refers to when the vehicle is turning left or right. This may include making left-hand and right-hand turns, U-turns, driving on a circular entrance ramp or exit ramp, etc. If the vehicle is cornering, operation 306 is performed, otherwise operation 302 is performed. This assures that the vehicle is moving when the alignment is performed. If the vehicle is not moving, then the alignment is not performed. In one embodiment, the alignment is not performed if the vehicle is not turning.

At 306, the online alignment module 104 selects and aggregates data associated with the cornering (or turning) event. The aggregated LIDAR data in world coordinates $L^W$ may be represented by equation 6, where X is matrix multiplication, $L_i^W = [x_i^W, y_i^W, z_i^W]^T$, and specific points are selected based on turning points, as further described below. The method of FIG. 3 is an optimization method that begins with an initial estimate and/or default of the transformation matrix $T_{LtoV}$ and then includes optimizing the entries in this matrix.

$$L^W : L^W = \{L_i^W\} = \{T_{VtoW,i} \times T_{LtoV} \times L_i\} \quad (6)$$

At 308, the online alignment module 104 performs target selection based on the aggregated data. The online alignment module 104 determines a turning point and based on the turning point determines a selected area to monitor. The perimeter of the selected area may be circular and a predetermined distance from the turning point. Ground points are removed from the selected area and one or more targets in the selected area are selected to monitor. Ground points j are selected from $L_i^W$, where equation 7 holds true. Ground points are removed and then a data clustering algorithm, such as a density based spatial cluster of application with noise (DBSCAN) algorithm, is implemented to identify and select one or more targets. Each target (e.g., light pole, traffic sign, tree, etc.) is selected with the greatest number of points associated with a ground point.

At 310, the online alignment module 104 determines whether the target data buffer 222 is full. If yes, operation 312 is performed, otherwise operation 302 may be performed. Once there is enough target data (e.g., data associated with 3-10 targets), then operation 312 is performed.

At 312, the online alignment module 104 performs optimization of loss function, which may be represented by equation 7. The online alignment module 104 searches for a best alignment transformation matrix $T_{LtoV}$ to minimize the loss function with gradient based variant step optimization.

$$\text{Loss} = \sum_{i=1}^{N} \sum_{j}^{M} \sqrt{(x_j^W - x_i^W)^2 + (y_j^W - y_i^W)^2 + (z_j^W - z_i^W)^2} / (M * N) \quad (7)$$

The optimization of the loss function is performed to minimize distances of points relative to a reference point for a target and thus maximize point density for each target and as a result sharpen the images of the one or more targets. The method may end at 314 subsequent to performing operation 312. The above-stated method provides overall flow and includes (i) a dynamic target selection algorithm and (ii) a fast-optimization algorithm.

Figure 4:
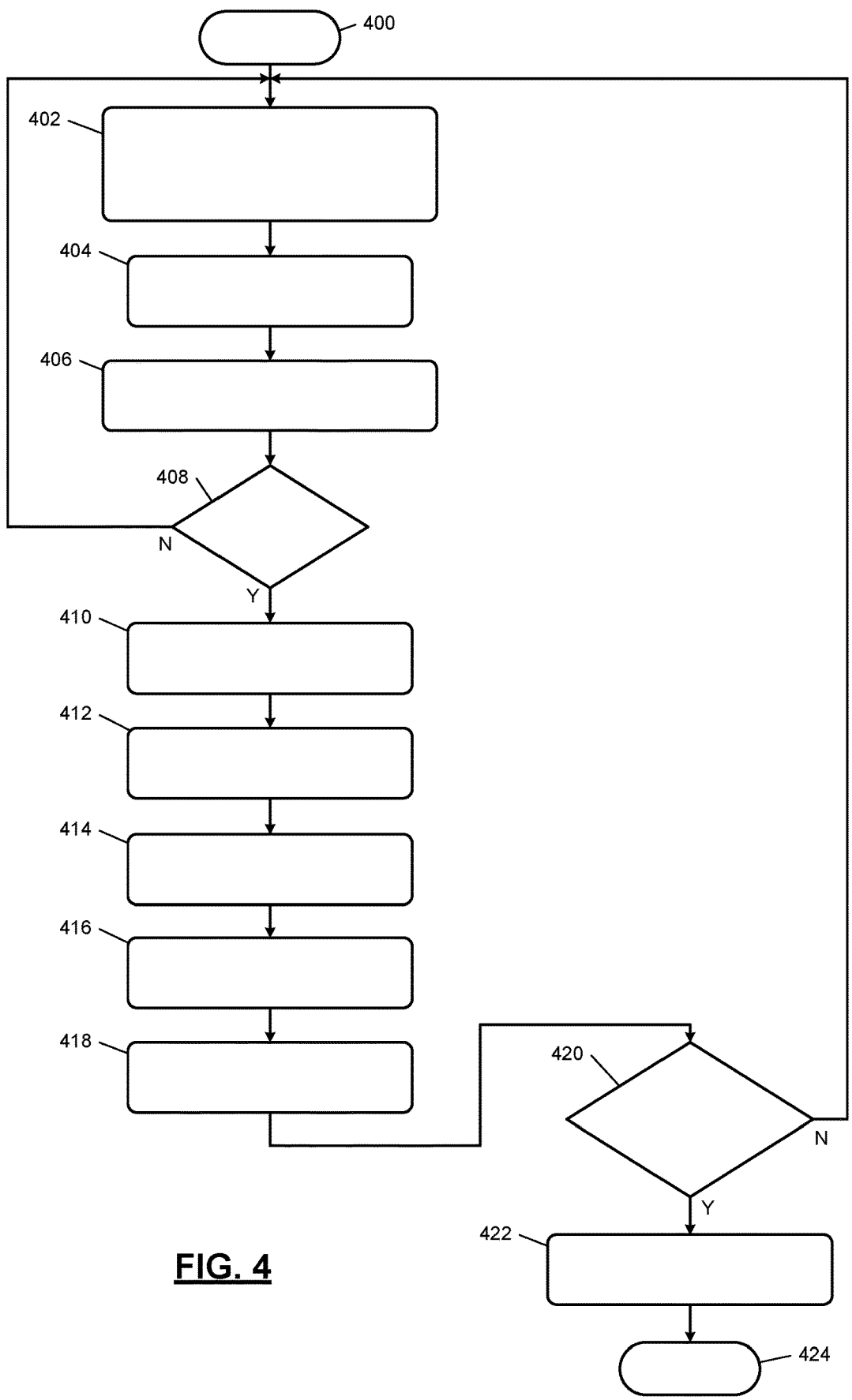
FIG. 4 illustrates the alignment method of FIG. 3 in further detail.

FIG. 4 shows the alignment method of FIG. 3 in further detail. The method may begin at 400. At 402, the online alignment module 104 loads LIDAR frames and inertial navigation system (INS) data, for example from the sensors 186, 190. The LIDAR frames and INS data may be loaded into, for example, queues of the autonomous driving module 105.

At 404, the online alignment module 104 accumulates N frames of data in order to build a scan. At 406, the online alignment module 104 calculates INS system data corresponding to localization data using interpolation.

At 408, the online alignment module 104 determines whether the vehicle speed is greater than a predetermined speed threshold. If yes, operation 410 is performed, otherwise operation 402 is performed. At 410, the online alignment module 104 the LIDAR data and the localization data is stored in the raw data buffer 220.

Figure 5:
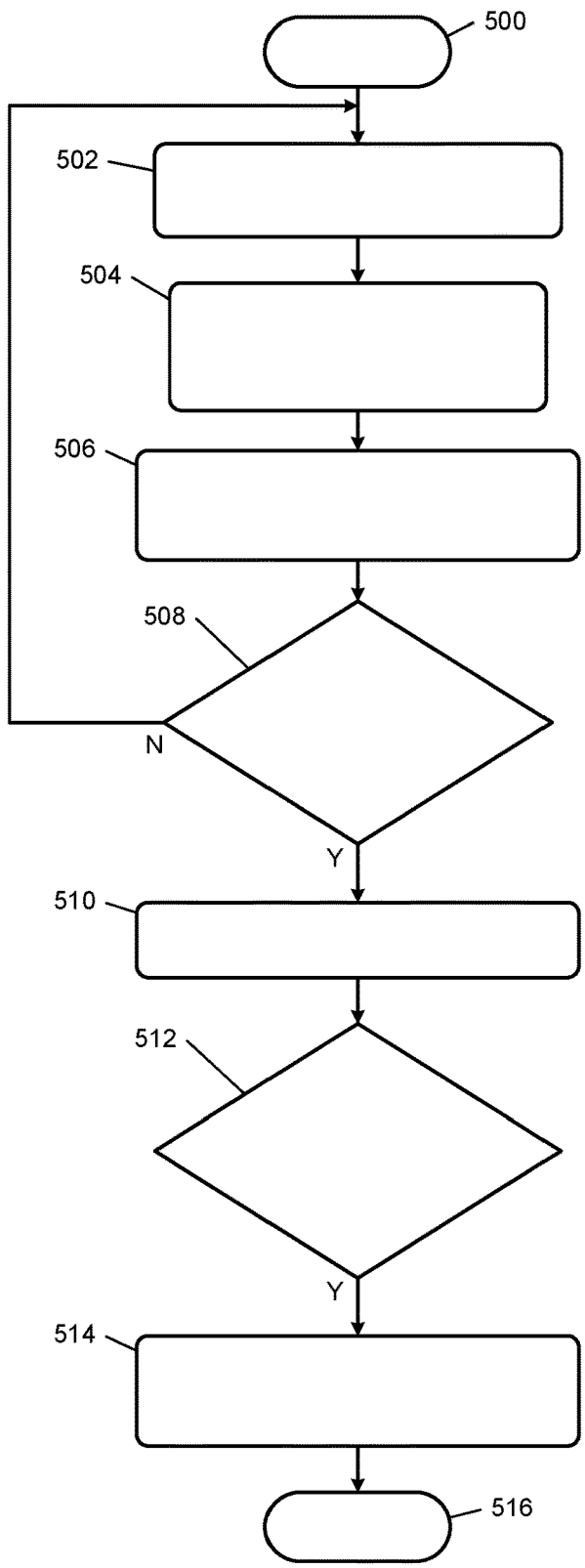
FIG. 5 illustrates an example buffer management and data filtering method in accordance with the present disclosure.
Figure 6:
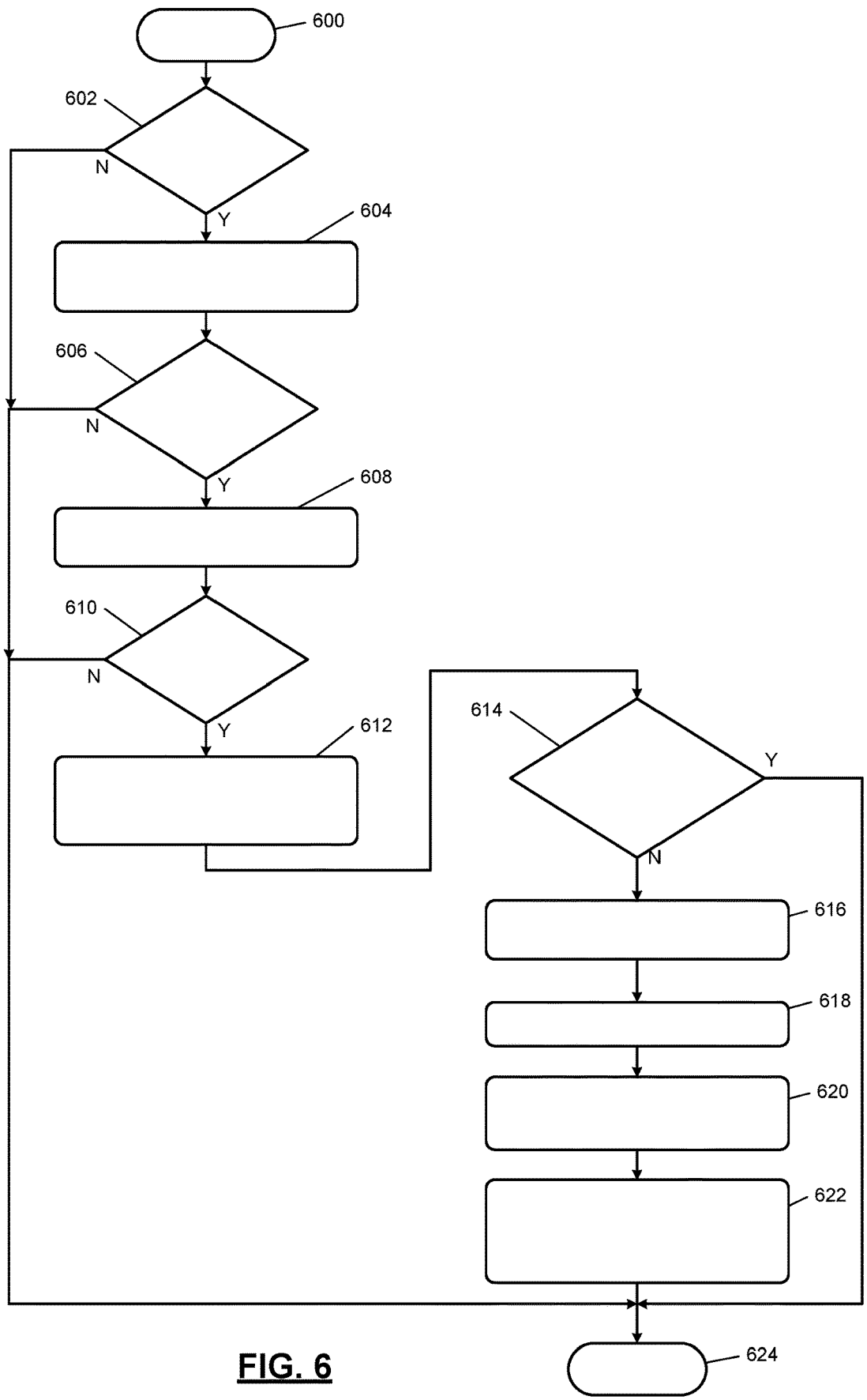
FIG. 6 illustrates an example feature extraction and filtering algorithm in accordance with the present disclosure.

At 412, the online alignment module 104 runs a buffer management and data filtering algorithm (or method) as shown in FIG. 5. At 414, the online alignment module 104 runs a feature extraction and filtering algorithm as shown in FIG. 6.

At 416, the online alignment module 104 accumulates multiple scenes of data. Data for multiple different scenes (e.g., scenes associated with multiple cornering events) are accumulated. Multiple scenes of data are accumulated to improve robustness. Each scene may be associated with one or more targets. At 418, the online alignment module 104 runs the optimization algorithm and saves results in the result transformation matrix buffer 224.

At 420, the online alignment module 104 determines whether all raw data stored in the raw data buffer 220 is for the current iteration of this method. If yes, operation 422 is performed, otherwise operation 402 is performed. At 422, the online alignment module 104 reports the alignment results. This may include reporting the transformation matrix $T_{LtoV}$ for future use. The method may end at 424 subsequent to performing operation 422.

FIG. 5 illustrates an example buffer management and data filtering method. The method may be iteratively performed and may begin at 500. At 502, the online alignment module 104 converts the vehicle-to-world transformation data to 6-parameter data including Tx, Ty, Tz, roll ($\alpha$), pitch ($\beta$), yaw ($\gamma$) data.

At 504, the online alignment module 104 appends LIDAR data, vehicle to world transformation data and 6-parameter data to one or more buffers (e.g., one or more of the raw data buffer 220 and the other buffers 226). In one embodiment, three raw data buffers are used to respectively store the LIDAR data, vehicle to world transformation data, and 6-parameter data. At 506, the online alignment module 104 loads the last two buffer events worth of the 6-parameter data for each of the 6-parameters.

At 508, the online alignment module 104 determines whether a difference between two consecutive events worth of data is greater than a predetermined difference threshold. If yes, operation 510 is performed, otherwise operation 502 is performed. Operations 506 and 508 are implemented to perform a continuity check and detect discontinuities (or errors). For example, if the vehicle is moving and the data for two consecutive events is indicative of the vehicle standing still or vehicle moving in a wrong direction, then a discontinuity and/or error exists. If a discontinuity and/or error exists, then operation 510 is performed to remove the corresponding record of data from the one or more buffers where the record of data is stored. If no discontinuity and/or error exists, then operation 502 is performed.

At 512, the online alignment module 104 determines whether the amount of data stored in the one or more buffer(s) is greater than a maximum threshold. At 514, the online alignment module 104 removes the initial data point of data (or the oldest stored data point of data) from the one or more buffers and sets a data ready flag equal to True. The method may end at 516 subsequent to performing operation 514.

FIG. 6 illustrates an example feature extraction and filtering algorithm. The algorithm may be iteratively performed and may begin at 600. At 602, the online alignment module 104 determines whether the ready flag is equal to True. If yes, operation 604 is performed, otherwise the method may end at 624.

At 604, the online alignment module 104 calculates the yaw angle change during a buffer period. At 606, the online alignment module 104 determines whether the yaw angle change is greater than a predetermined angle threshold (e.g., 80° or) 90°. If yes, operation 608 is performed, otherwise the method may end at 624.

At 608, the online alignment module 104 determines information about the turning location. The information may include a turning angle (e.g., yaw angle change at 45°) and/or whether the turn is longer than a predetermined distance threshold (e.g., 20 meters).

At 610, the online alignment module 104 determines whether the turning location information is available. If yes, operation 612 is performed, otherwise the method may end at 624. At 612, the online alignment module 104 calculates changes in vehicle Tx and Ty values for sequentially collected data points.

At 614, the online alignment module 104 if a discontinuity in data exists and the change is greater than a predetermined threshold, then the method may end at 624, otherwise operation 616 may be performed. At 616, the online alignment module 104 aggregates LIDAR scans of data within a predefined area for data selection. For example, an area near a turning reference point x, y, such as in a range of x+20 to x+40, y+30 to y+60. Operation 616 is performed for area selection in which targets are selected in subsequent operation. At 618, the online alignment module 104 performs target selection, as described below with respect to the method of FIG. 7.

At 620, the online alignment module 104 down samples each frame of data using an intensity filter and a random filter to minimize a number of computations. At 622, saves the target data to the target data buffer 222, clears raw data (e.g., clears last 800 frames) in the one or more buffers, and sets data ready flag equal to False. Setting the data ready flag equal to False causes the online alignment module 104 to wait for another predetermined amount of data to be collected in the one or more buffers (e.g., in the raw data buffer). The method of FIG. 6 may end at 624 subsequent to performing operation 622.

In the above described methods, a predetermined number of frames (e.g., 800 frames) of data are collected in a first one or more buffers (raw data buffers), which are cleared subsequent to when targets are selected and corresponding target data obtained from the frame data is stored in a second one or more buffers (target data buffers). Targets are selected and target data is stored in the second one or more buffers, which are not cleared until optimization is performed.

Figure 7:
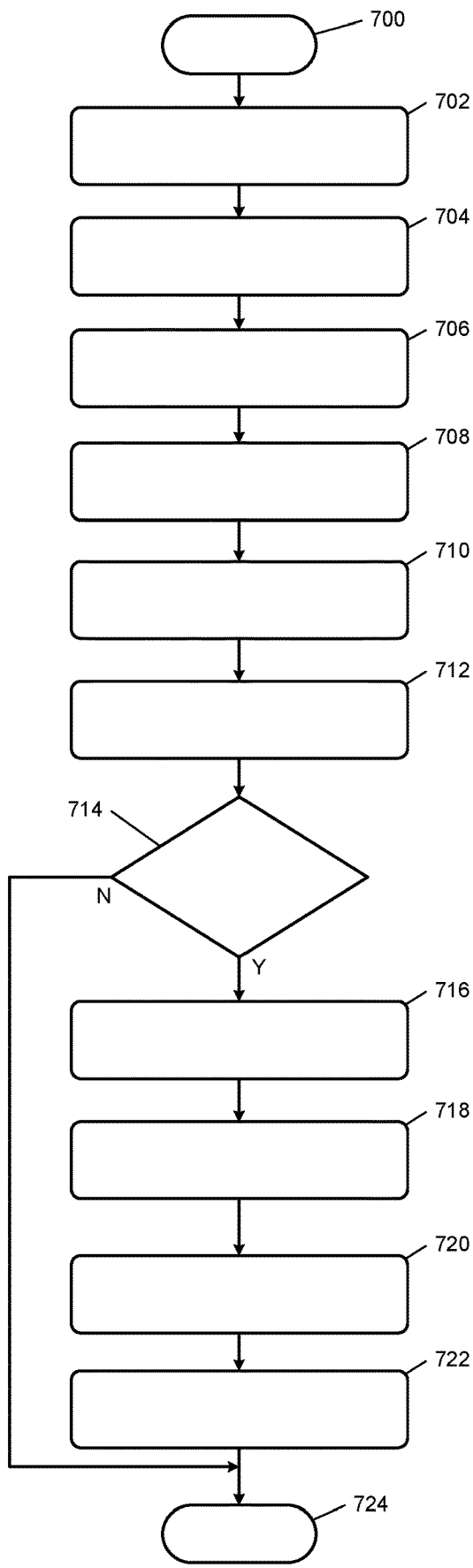
FIG. 7 illustrates an example target selection algorithm in accordance with the present disclosure.

FIG. 7 illustrates an example target selection algorithm. The algorithm may be iteratively performed and may begin at 700. At 702, the online alignment module 104 obtains a z value for each LIDAR scan. Most LIDAR data points are ground points. For this reason, calculations are performed in the z direction.

At 704, the online alignment module 104 obtains a normal distribution of LIDAR data to extract a mean value. At 706, the online alignment module 104 selects data around the mean plus or minus a first threshold (or predetermined value). At 708, the online alignment module 104 obtains a normal distribution of the selected data to determine another mean value that is not based on ground points.

At 710, the online alignment module 104 extracts ground points around the another mean plus or minus a second threshold (or predetermined value). This may be implemented using equation 8. Ground points are identified from LIDAR point cloud and removed in a vertical dimension z, where ε is a threshold referring to an average of the selected data points.

$$z_{i,j}^W \in \left[ \sum_j \frac{z_{i,j}^W}{p} - \varepsilon, \sum_j \frac{z_{i,j}^W}{p} + \varepsilon \right] \quad (8)$$

At 712, the online alignment module 104 labels other data points as target data.

At 714, the online alignment module 104 determines whether an amount of target data stored in the target data buffer 222 is greater than a third threshold. If yes, the method may end at 724, otherwise operation 716 may be performed.

At 716, the online alignment module 104 performs clustering on target data (e.g., performs a DBSCAN to find cluster). At 718, the online alignment module 104 selects N targets with most points. At 720, the online alignment module 104 selects ground points based on a predefined space filter.

At 722, the online alignment module 104 aggregates all selected target data and ground data and saves the aggregated data to the target data buffer 222. The method may end at 724 subsequent to performing operation 720.

Figure 8:
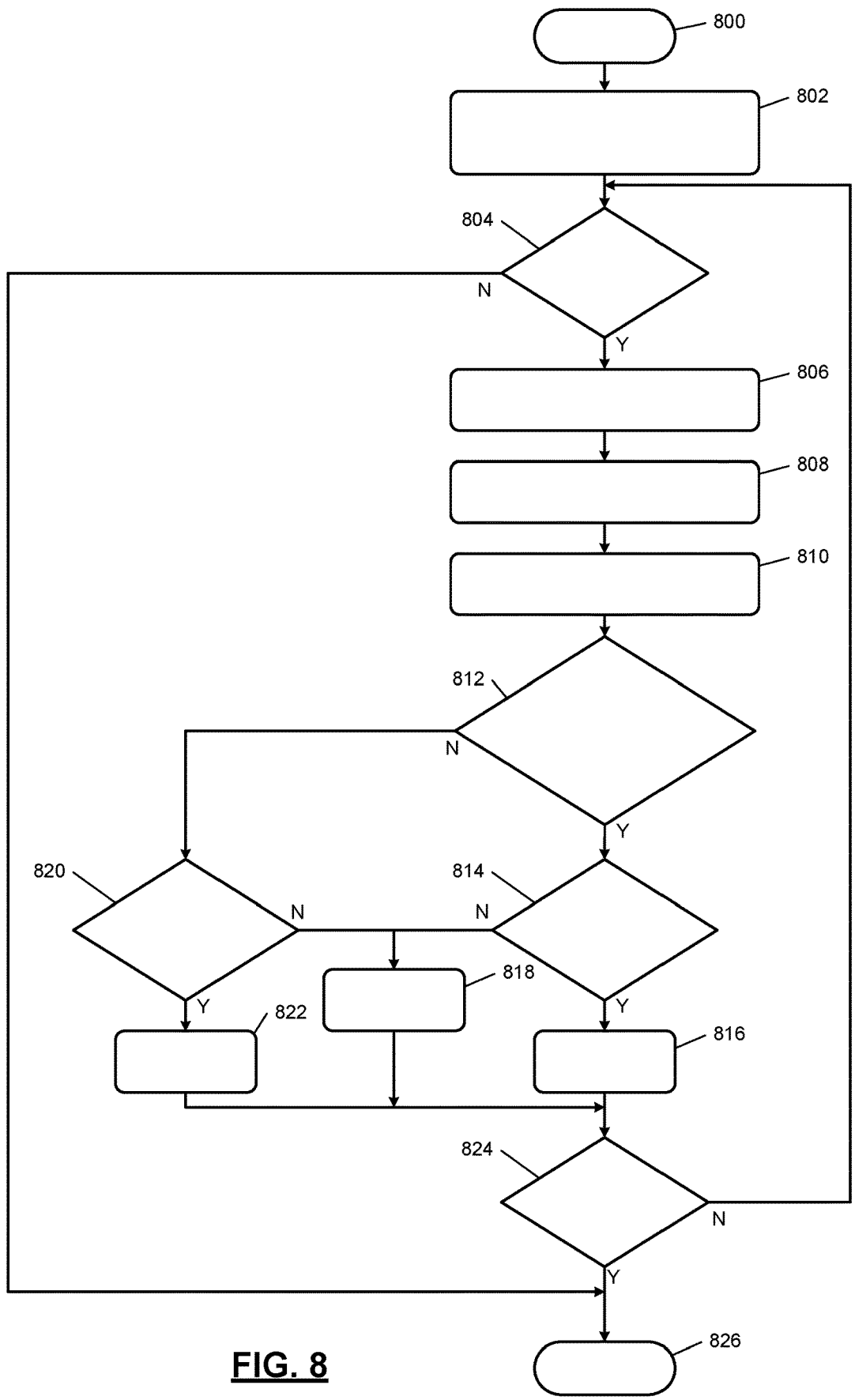
FIG. 8 illustrates an example optimization algorithm in accordance with the present disclosure.

FIG. 8 illustrates an example optimization algorithm to optimize the alignment results (or transformation matrix $T_{LtoV}$). This is accomplished by reducing and minimizing the loss, such as that calculated using equation 8. The algorithm may be iteratively performed and may begin at 800. At 802, the online alignment module 104 loads 5 optimization parameters (Tx, Ty, α, β, γ) and an initial estimate of the alignment matrix $T_{LtoV}$ and sets a step value equal to 0. The parameter Tz is not loaded.

At 804, the online alignment module 104 determines whether the step value is greater than a predetermined number of steps threshold. If yes, the method may end at 826, otherwise operation 806 is performed.

At 806, the online alignment module 104 increases or decreases the alignment results by making a change to one or more of the 5 parameters (Tx, Ty, α, β, γ) based on a translation change (e.g., ±0.1 meters or ±0.2 degrees).

At 808, the online alignment module 104 evaluates the loss function. This evaluation may include: (i) calculating the LIDAR-to-world transformation matrix $T_{LtoW}$ using current alignment results ($T_{LtoV}$); (ii) projecting aggregated LIDAR data to the world coordinates ($T_{VtoW,i} \times T_{LtoV} \times L_i$); (iii) applying a K-D tree to the world coordinate data; (iv) for each point, calculating distance to neighboring points; and (v) using the average of all distances as the loss (or loss value) provided by the loss function, as similarly shown by equation 8. The K-D tree is used to organize data and quickly determine a distance. A K-D tree is a binary tree in which every node is a k-dimensional point. At 810, the online alignment module 104 updates the alignment results if the loss decreases. If the loss decreases (i.e. improves), the change made at 806 is maintained.

At 812, the online alignment module 104 determines whether the alignment result change is in the same direction for the last two iterations of the method. For example, the last two iterations may have the same amount of increase in one or more parameters or the same amount of decrease in one or more parameters.

At 814, the online alignment module 104 determines whether the change is within a first predefined range. If yes, operation 816 is performed, otherwise operation 818 is performed. At 816, the online alignment module 104 increases the change made at 806. For example, the change may be increased by 0.2 meters and/or by 0.4 degrees. At 818, the online alignment module 104 maintains the change made at 806.

At 820, the online alignment module 104 determines whether the change is within the second predefined range. If yes, operation 822 is performed, otherwise operation 818 is performed. At 822, the online alignment module 104 decreases the change made at 806. For example, the change may be decreased by 0.5 meters and/or by 0.1 degrees.

At 824, the online alignment module 104 determines whether the change in the loss is less than a predetermined loss threshold. If yes, the method may end at 826, otherwise operation 804 is performed.

The optimization algorithm (or method) of FIG. 8 includes searching for a best LIDAR-to-vehicle transformation matrix $T_{LtoV}$ that minimizes a loss function with gradient based variant step optimization. The optimization algorithm may additionally or alternatively implement a stochastic gradient descent (SGD) algorithm, a root mean square propagation and adaptive gradient algorithm (or adaptive momentum (ADAM) algorithm), a particle swarm optimization (PSO), and a generic algorithm (GA) to optimize the alignment results (or transformation matrix $T_{LtoV}$).

Figure 9:
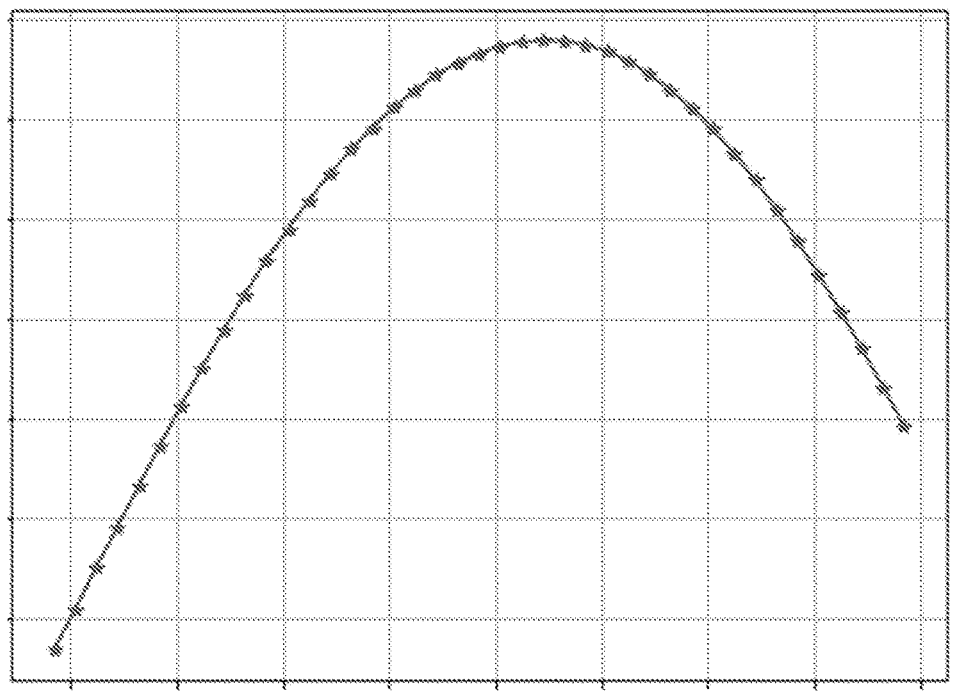
FIG. 9 is an example plot of loss verses translation distance using a first density characterization method in accordance with the present disclosure.
Figure 10:
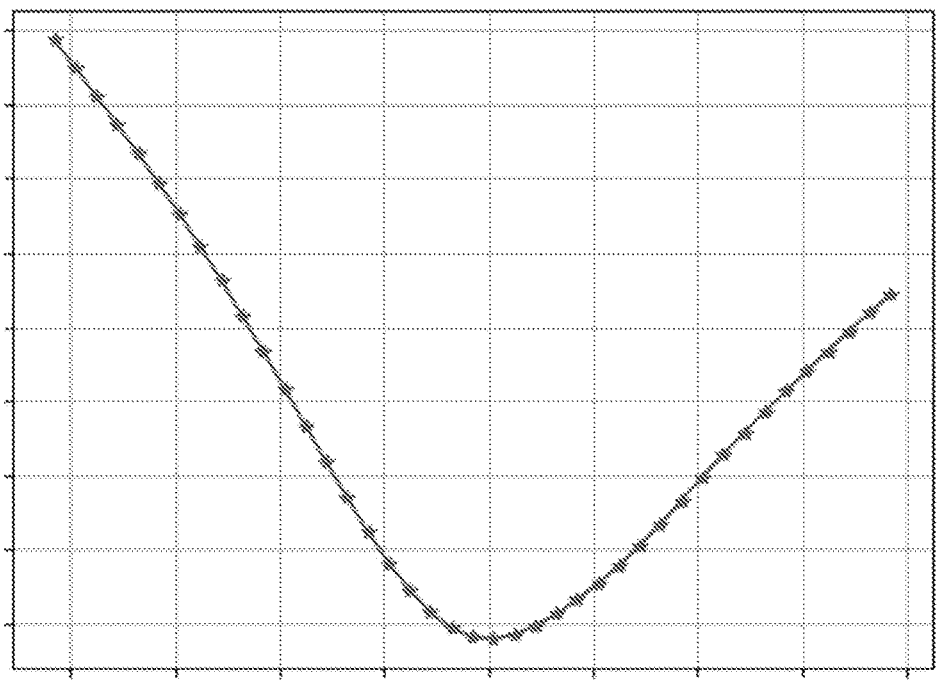
FIG. 10 is an example plot of loss verses translation distance using a second density characterization method in accordance with the present disclosure.

One or more different loss functions may be utilized in the method of FIG. 8 to characterize point density. Point density is increased for selected targets to improved image clarity and resultant decision accuracy. Actions are performed based on the resultant images. As a first example, a first density characterization method may be implemented including, for each selected point of data, determining a count of how many other points are within a predetermined radius (e.g., 0.5 meters) of the selected point. FIG. 9 shows an example plot of loss verses translation distance using the first density characterization method. As another example, a second density characterization method may be implemented including, for each point, calculating an average distance for the nearest 20 points. This may include using equation 8. FIG. 10 shows an example plot of loss verses translation distance using the second density characterization method. As a third example, a third density characterization method may be implemented including, for each point, calculating a sum of three eigenvalues using point cloud alignment (PCA) on nearby points.

The above-described operations of FIGS. 3-8 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A LIDAR-to-vehicle alignment system comprising:
a memory configured to store points of data provided based on an output of one or more LIDAR sensors and localization data;
an alignment module configured to perform an alignment process comprising
based on the localization data, determining whether a host vehicle is turning,
in response to determining that the host vehicle is turning, selecting a portion of the points of data and aggregating the selected portion of the points of data to provide aggregated data, selecting targets based on the aggregated data, wherein the targets refer to detected objects, and based on the selected targets, iteratively reducing a loss value of a loss function to provide a resultant LIDAR-to-vehicle transformation matrix; and an autonomous driving module configured to based on the resultant LIDAR-to-vehicle transformation matrix, convert at least the selected portion of the points of data to at least one of vehicle coordinates or world coordinates to provide resultant data, and perform one or more autonomous driving operations based on the resultant data.

2. The LIDAR-to-vehicle alignment system of claim 1, wherein the alignment module is configured to receive the localization data from one or more of a global position sensor or an inertial measurement sensor.

3. The LIDAR-to-vehicle alignment system of claim 1, wherein the alignment module is configured to refrain from performing data selection and aggregation and target selection when the host vehicle is not cornering.

4. The LIDAR-to-vehicle alignment system of claim 1, wherein the alignment module is configured to select data points and the targets based on turning points.

5. The LIDAR-to-vehicle alignment system of claim 1, wherein the alignment module is configured to select an area based on a turning point, remove ground points based on the selected area, identify a plurality of targets, and perform a data clustering algorithm to select one of the plurality of targets to monitor.

6. The LIDAR-to-vehicle alignment system of claim 1, wherein the alignment module is configured to accumulate multiple scenes of LIDAR data and, based on the multiple scenes of LIDAR data, minimize the loss value.

7. The LIDAR-to-vehicle alignment system of claim 1, wherein the alignment module is configured to perform a continuity check to determine which of the points of data to select and which of the points of data to discard.

8. The LIDAR-to-vehicle alignment system of claim 1, wherein the alignment module is configured to:
aggregate LIDAR scans of data for a predefined space;
based on the aggregated LIDAR scans of data, perform target selection; and
subsequent to performing target selection, down sample each frame of data associated with the aggregated LIDAR scans of data using an intensity filter and a random filter to provide resultant target data.

9. The LIDAR-to-vehicle alignment system of claim 1, wherein the alignment module is configured to:
get a z value for each of a plurality of LIDAR scans;
obtain a normal distribution of the aggregated data associated with the LIDAR scans to extract a first mean value of the aggregated data associated with the LIDAR scans;
select data around the first mean value;
obtain another normal distribution of the selected data around the first mean value to obtain a second mean value that is not based on ground points;
extract ground points around the second mean value;
label data other than the ground points as target data; and
when a predetermined amount of target data is collected, perform a clustering algorithm to select a portion of the target data.

10. The LIDAR-to-vehicle alignment system of claim 1, wherein the alignment module is configured to, when iteratively reducing the loss value:
load optimization parameters and an initial estimated LIDAR-to-vehicle transformation matrix; and
iteratively
change the initial estimated LIDAR-to-vehicle transformation matrix or a last determined LIDAR-to-vehicle transformation matrix to provide the resultant LIDAR-to-vehicle transformation matrix,
evaluate the change in the resultant LIDAR-to-vehicle transformation matrix including determining the loss value, and
based on the loss value, determining whether to perform another iteration.

11. The LIDAR-to-vehicle alignment system of claim 1, wherein the alignment module is configured to, when evaluating the loss function:
calculate a LIDAR-to-world transformation matrix using the resultant LIDAR-to-vehicle transformation matrix;
project the aggregated data to world coordinate data based on the LIDAR-to-world transformation matrix;
apply a binary tree to the world coordinate data;
provide a plurality of distances by, for each LIDAR data point of a plurality of LIDAR data points, calculating a distance to a neighboring data point; and
determine the loss value based on an average of the plurality of distances.

12. The LIDAR-to-vehicle alignment system of claim 1, wherein the loss function is a density-based loss function that characterizes at least one of LIDAR misalignment severity or point density relative to one of the selected targets.

13. An autonomous vehicle driving method comprising:
storing points of data provided based on an output of one or more LIDAR sensors and localization data;
performing a LIDAR-to-vehicle alignment process comprising
based on the localization data, determining whether a host vehicle is turning,
in response to determining that the host vehicle is turning, selecting a portion of the points of data and aggregating the selected portion of the points of data to provide aggregated data,
selecting targets based on the aggregated data, wherein the targets refer to detected objects, and
based on the selected targets, iteratively reducing a loss value of a loss function to provide a resultant LIDAR-to-vehicle transformation matrix;
based on the resultant LIDAR-to-vehicle transformation matrix, converting at least the selected portion of the points of data to at least one of vehicle coordinates or world coordinates to provide resultant data; and
performing one or more autonomous driving operations based on the resultant data.

14. The autonomous vehicle driving method of claim 13, further comprising:
selecting an area based on a turning point;
removing ground points based on the selected area;
identifying a plurality of targets; and
performing a data clustering algorithm to select one of the plurality of targets to monitor.

15. The autonomous vehicle driving method of claim 13, further comprising:
performing a continuity check to determine which of the points of data to select and which of the points of data to discard; and accumulating multiple scenes of LIDAR data and, based on the multiple scenes of LIDAR data, minimizing the loss value.

16. The autonomous vehicle driving method of claim 13, further comprising:
aggregating LIDAR scans of data for a predefined space;
based on the aggregated LIDAR scans of data, performing target selection; and
subsequent to performing target selection, down sampling each frame of data associated with the aggregated LIDAR scans of data using an intensity filter and a random filter to provide resultant target data.

17. The autonomous vehicle driving method of claim 13, further comprising:
getting a z value for each of a plurality of LIDAR scans;
determining at least one mean value based on the aggregated data associated with the LIDAR scans;
extracting ground points based on the at least one mean value;
labeling data other than the ground points as target data; and
when a predetermined amount of target data is collected, performing a clustering algorithm to select a portion of the target data.

18. The autonomous vehicle driving method of claim 13, further comprising, when iteratively reducing the loss value:
loading optimization parameters and an initial estimated LIDAR-to-vehicle transformation matrix; and
iteratively
changing the initial estimated LIDAR-to-vehicle transformation matrix or a last determined LIDAR-to-vehicle transformation matrix to provide the resultant LIDAR-to-vehicle transformation matrix,
evaluating the change in the resultant LIDAR-to-vehicle transformation matrix including determining the loss value, and
based on the loss value, determining whether to perform another iteration.

19. The autonomous vehicle driving method of claim 13, further comprising, when evaluating the loss function:
calculating a LIDAR-to-world transformation matrix using the resultant LIDAR-to-vehicle transformation matrix;
projecting the aggregated data to world coordinate data based on the LIDAR-to-world transformation matrix;
based on the world coordinate data, providing a plurality of distances by, for each LIDAR data point of a plurality of LIDAR data points, calculating a distance to a neighboring data point; and
determining the loss value based on an average of the plurality of distances.

20. The LIDAR-to-vehicle alignment system of claim 1, wherein the LIDAR-to-vehicle transformation matrix refers to a transformation between LIDAR coordinates and vehicle coordinates.

* * * * *